(No Model.)
J. BOYD.
ART OF MAKING BUTTER.
No. 406,081. Patented July 2, 1889.
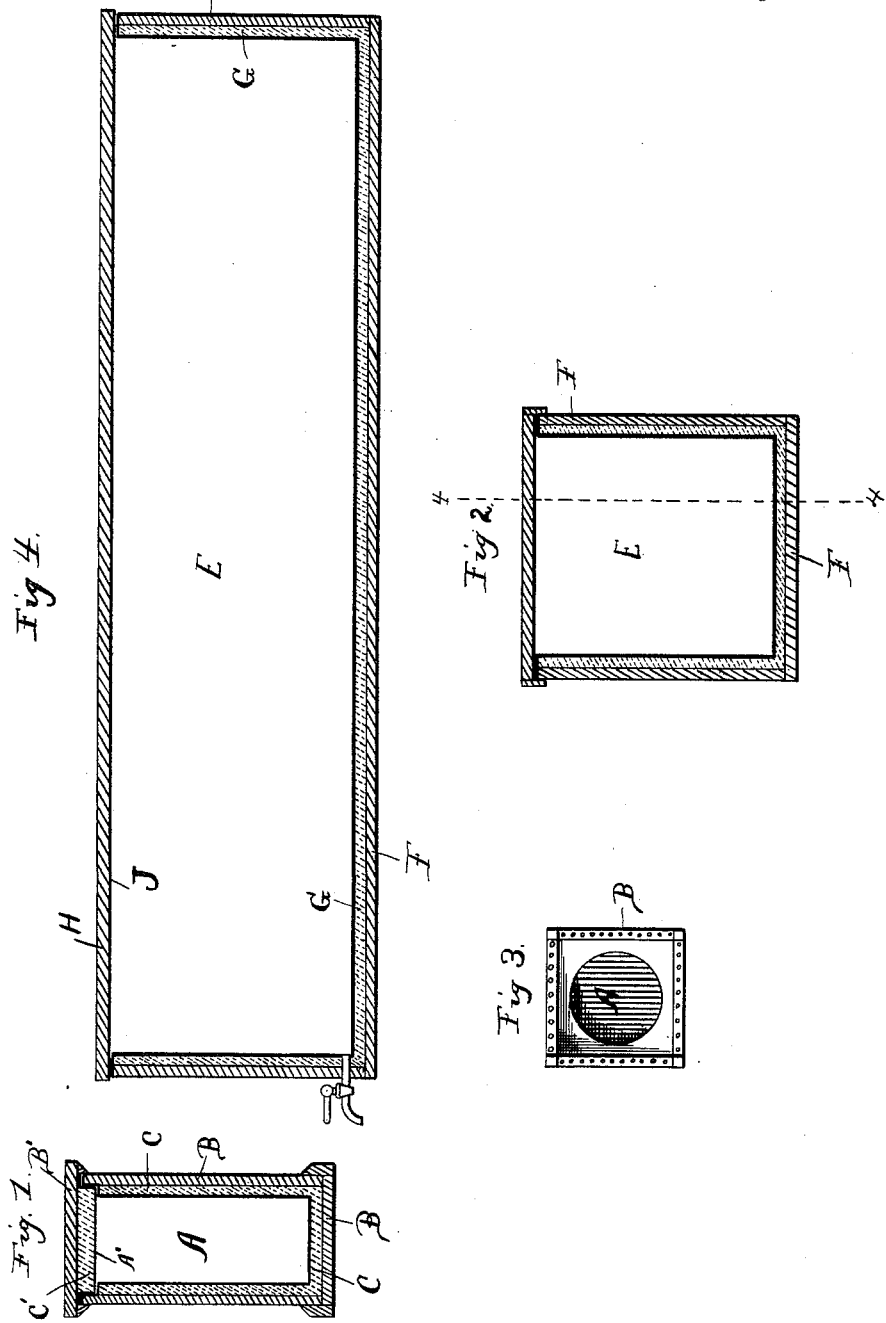
Witnesses:
Mack A. Claflin.
N. M. Munday.
Inventor:
John Boyd.
By Munday, Evarts & Adcock,
his Attorneys.

UNITED STATES PATENT OFFICE.

JOHN BOYD, OF ELMHURST, ILLINOIS.

ART OF MAKING BUTTER.

SPECIFICATION forming part of Letters Patent No. 406,081, dated July 2, 1889.

Application filed December 7, 1888. Serial No. 292,383. (No specimens.)

*To all whom it may concern:*

Be it known that I, JOHN BOYD, a citizen of the United States, residing in Elmhurst, in the county of Du Page and State of Illinois, have invented a new and useful Improvement in the Art of Making Butter, of which the following is a specification.

This invention relates to improvements in the art of making butter.

It has long been known that when the cream from which the butter is to be churned is in a peculiar acid condition, well understood by some skillful butter-makers, and determined by the peculiar taste and smell known to the skillful manipulator, the cream will churn easier and quicker, more butter will be produced, having a better flavor and better keeping properties. This exact condition cannot be described in words, and can only be known to persons who have acquired the knowledge by actual practice. Various efforts have been made to artificially produce this peculiar condition in the cream, chief among which, and perhaps the most successful, is what I have heard called the "Danish method," and it consists in mixing with the cream about twenty-four hours before it is used a small proportion of what is called a "starter," consisting of skimmed milk which has first been warmed to about 90° Fahrenheit and allowed to stand twenty-four hours, when, if the conditions have chanced to be right, the milk will be found to have thickened and to have turned slightly acid. About from one to two per cent. of this starter is mixed with the cream, the latter being at a temperature of about 65° Fahrenheit, and the cream then allowed to stand twenty-four hours, when it is churned. I have been able occasionally to produce splendid results by this "Danish process," so called, but have found it extremely uncertain, although I have had an experienced Danish butter-worker in my employ. In the first place I experienced great difficulty and uncertainty in producing the starter. Sometimes the skimmed milk would be found in the right condition, and at other times it would be found worthless for that purpose. In the next place, even when the starter was right and properly applied to the cream, I would find the latter at the end of twenty-four hours unequally ripened, and the result would be a diminution in the quantity of butter, or an inferior quality, or both.

The present invention is the result of my efforts and experiments with the Danish process. I apprehended that the great uncertainty both with regard to the preparation of the starter and the ripening of the cream might be due to the changes in the temperature of the milk and cream, and I have found that where the milk is incased in a non-conducting vessel or substance the result is always sure and certain, and where the cream is inclosed in a non-conducting vat the ripening is effected in a perfectly uniform manner throughout the mass and the cream always the same in condition. By this simple means it is possible, therefore, to produce the best results without the skilled labor which has heretofore been necessary, and with entire uniformity, so that the chief difficulty in butter-making is overcome.

In the accompanying drawings, which form part of this specification, I have shown at Figure 1 a sectional view of a skimmed-milk vessel such as I use for inclosing the milk during the preparation of the starter, and at Fig. 2 a similar sectional view of a non-conducting cream-vat for containing the cream after admixture of the starter and during the ripening thereof. Fig. 3 is a plan view of the device shown at Fig. 1 with the cover removed, and Fig. 4 is a cross-section of the cream-vat on the line 4 4 of Fig. 2.

Of course any suitable non-conducting vessels may be employed in the practice of my invention; but I have found the following to be excellently adapted to that purpose. The vessel for containing the skimmed milk, and shown at Figs. 1 and 3, consists of a tin can A, built into a wooden box B, as shown in the drawings, the space between the tin and the wood being filled with felt C. A cover composed of a wooden part B', the tin part A', and felt filling C' serves to close the can and box tightly.

The cream-vat (shown at Figs. 2 and 4) may consist of a metal tank E, built into a wooden box F and having an interposed felt filling G. I find that it is not strictly necessary in the case of the cream-vat to have the cover metal-lined and filled with felt; but this may be done, if preferred; and in the drawings I have shown a cover for the vat made of wood H and simply lined with tin J, the same being so contrived that it may slide longitudinally to open and close the vat.

In the practice of my improvement in the art of butter-making I take of skimmed milk, perfectly sweet, and from which all cream has been carefully removed, from two to four gallons. Less may be used, of course, but I find it better to use a considerable body—say two gallons. I heat this milk in a water bath, preferably, and to a temperature of 90° Fahrenheit. This temperature may be varied to a considerable degree above and somewhat below that point; but I have found by far the best result to be produced by a rigid adherence to the exact point of 90° Fahrenheit. While the milk is heating I warm the interior of the milk-vessel by rinsing it with warm water, and then place the heated milk in the vessel shown at Fig. 1, cover the same, and let it stand thus for twenty-four hours, more or less. I find by observation that the temperature of the milk changes in the vessel very slowly and regularly, usually gradually and slowly falling, but not in such degree as to interfere with the chemical change which it is necessary shall take place in the milk to produce the desired condition. I have not yet been able to definitely locate the exact period of time at which the inclosed milk first assumes the required condition. It may be that it reaches this stage in a much shorter time than twenty-four hours. I expect to conduct experiments with a view to ascertain the shortest period, but at present and thus far have deemed this an immaterial fact, because in the manufacture of butter it is customary to churn not oftener than once a day, and twenty-four hours is therefore an extremely convenient period of time to allow the milk to set, as it brings the operation to the same hour each day. I place the cream in the vat shown at Figs. 2 and 4, and by some means bring it to a temperature of about 65° Fahrenheit. The means I prefer to employ for this purpose is, in case the cream is too cold, a tin vessel or can full of hot water lowered into the body of the cream and waved or moved about therein until the temperature of the whole body of cream is uniformly raised to the required degree. In case the cream is too warm, cold water or ice may be used instead of the warm water.

To every one hundred quarts of cream I add from one pint to one quart of the starter. The starter, when taken from the vessel in which it has been prepared, will be found in a curdled or clabbered state, and in order to thin it and separate it it is advisable to strain or force it through the meshes of a fine hair sieve. The starter may be added to the cream either immediately before, during, or after the production of the right temperature in the cream; but I prefer to add it during the stirring operation, just above described, as this helps to incorporate it with the cream. The cream so prepared at the temperature indicated with the admixture of the starter prepared as stated is allowed to stand in the non-conducting vat for about twenty-four hours—i. e., until the next day's churning, at which time it is churned with the uniform results of the best quality and largest quantity of butter being produced.

While the cream is in the vat after admixture of the starter, it should be allowed to stand still and not be disturbed in any manner. I have found that stirring after the cream is once ready retards the operation of ripening, and, moreover, produces bad results. I recommend, also, in case of the preparation of the starter, that it be allowed to remain as quiet as possible, as any agitation will hinder and prevent the chemical change required.

No especial attention need be paid to the temperature of the room in which the vessels stand, either the milk-vessel or the cream-vat, as the non-conducting character of the vessels renders this temperature unimportant.

No claim is herein made to the improvement in the art of preparing starter for the ripening of cream in butter-making, which consists in first bringing skimmed milk to a proper temperature, as above specified, and, secondly, inclosing the same in a vessel having non-conducting walls, wherein it is permitted to remain twenty-four hours, (more or less,) substantially as above specified; nor to the improvement in the art of ripening cream in butter-making, which consists in bringing the cream to the required temperature, adding the necessary starter, and inclosing the cream with its admixture of starter at this temperature in a vessel with non-conducting walls, substantially as above specified, for the reason that I have reserved this subject-matter for two other applications filed in the United States Patent Office, March 18, 1889, Serial Nos. 303,639 and 303,640.

I claim—

The improvement in the art of butter-making, which consists, first, in preparing a starter from skimmed milk by inclosing the same at a proper temperature in a vessel with non-conducting walls; secondly, mixing the starter so prepared in small proportion with cream, and inclosing the mixture at a proper temperature, as indicated, in a non-conducting vat, permitting the same to ripen therein, and, lastly, churning the ripened cream into butter, substantially as specified.

JOHN BOYD.

Witnesses:
H. M. MUNDAY,
EDW. S. EVARTS.